(12) United States Patent
Kim et al.

(10) Patent No.: US 12,482,397 B2
(45) Date of Patent: Nov. 25, 2025

(54) DISPLAY DEVICE

(71) Applicants: Samsung Display Co., Ltd., Yongin-Si (KR); UNIST(ULSAN NATIONAL INSTITUTE OF SCIENCE AND TECHNOLOGY), Ulsan (KR)

(72) Inventors: Hyosun Kim, Yongin-si (KR); Youngshin Kwak, Ulsan (KR); Seonyoung Yoon, Ulsan (KR); Youngjun Seo, Yongin-si (KR); Inhye Heo, Yongin-si (KR)

(73) Assignees: Samsung Display Co., Ltd., Gyeonggi-do (KR); UNIST(ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 0 days.

(21) Appl. No.: 18/443,306

(22) Filed: Feb. 16, 2024

(65) Prior Publication Data
US 2025/0095537 A1 Mar. 20, 2025

(30) Foreign Application Priority Data
Sep. 18, 2023 (KR) .................. 10-2023-0124061

(51) Int. Cl.
*G09G 3/20* (2006.01)
*G09G 3/3233* (2016.01)

(52) U.S. Cl.
CPC ......... *G09G 3/2092* (2013.01); *G09G 3/3233* (2013.01); *G09G 2300/0819* (2013.01);
(Continued)

(58) Field of Classification Search
CPC .............. G09G 5/02; G09G 2360/144; G09G 2320/0666; G09G 2320/0626;
(Continued)

(56) References Cited

U.S. PATENT DOCUMENTS 6,762,741 B2  7/2004  Weindorf
9,251,738 B2  2/2016  Yachida et al.
(Continued)

FOREIGN PATENT DOCUMENTS

JP  4932067 B1  5/2012
JP  6041121 B2  12/2016
JP  6044188 B2  12/2016

OTHER PUBLICATIONS

Seonyoung Yoon et al., "Experimental Methods to investigate time-course of chromatic adaptation", Society for Imaging Science and Technology, vol. 34, Jan. 19, 2022, 4 pages.
(Continued)

*Primary Examiner* — Xuemei Zheng
(74) *Attorney, Agent, or Firm* — Innovation Counsel LLP

(57) ABSTRACT

A display device is provided. A display panel includes pixels configured to display an image. An illumination sensor measures an illumination of ambient light of the display panel. A controller controls the display panel so that the luminance of the pixels decreases during a first time interval when the illumination of the ambient light decreases and controls the display panel so that the luminance of the pixels increases during a second time interval when the illumination of the ambient light increases. The first time interval is shorter than the second time interval.

19 Claims, 12 Drawing Sheets

(52) U.S. Cl.
CPC ........... *G09G 2300/0842* (2013.01); *G09G 2300/0861* (2013.01); *G09G 2320/0233* (2013.01); *G09G 2320/0666* (2013.01); *G09G 2360/144* (2013.01)

(58) Field of Classification Search
CPC ............ G09G 2354/00; G09G 3/2092; G09G 3/3233; G02B 27/0172; G02B 27/0101; G02B 2027/0118; F21V 23/0464
See application file for complete search history.

(56) References Cited

U.S. PATENT DOCUMENTS

| | | | |
|---|---|---|---|
| 10,255,880 B1* | 4/2019 | Herf | G09G 5/10 |
| 2011/0175925 A1* | 7/2011 | Kane | G01J 1/4204 |
| | | | 345/589 |
| 2017/0263174 A1* | 9/2017 | Chen | G09G 5/02 |
| 2019/0180716 A1* | 6/2019 | Seo | G02B 27/017 |
| 2020/0064638 A1* | 2/2020 | Takagi | G02B 27/0172 |
| 2023/0162390 A1* | 5/2023 | Aoki | G06T 7/73 |
| | | | 345/8 |
| 2025/0022392 A1* | 1/2025 | Kishan | G09G 3/001 |

OTHER PUBLICATIONS

Garam Seong et al., "Effect of Experimental Methods on Brightness Scale", 2021 Korean Color Society Fall Conference, pp. 63-64, Dec. 2021, and English translation of the part highlighted in yellow, 3 pages.

Seonyoung Yoon et al., "Time-course analysis of change in display color appearance based on ambient light change", Journal of Information Display, Feb. 27, 2023, 12 pages.

* cited by examiner

<br>

FIG. 11
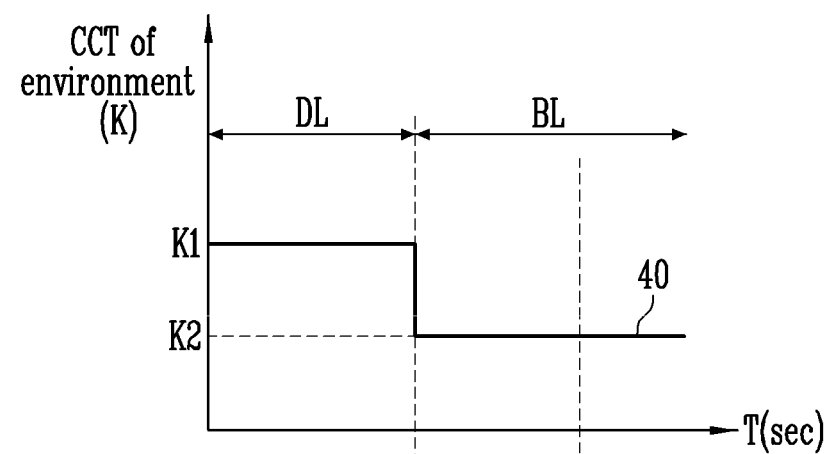
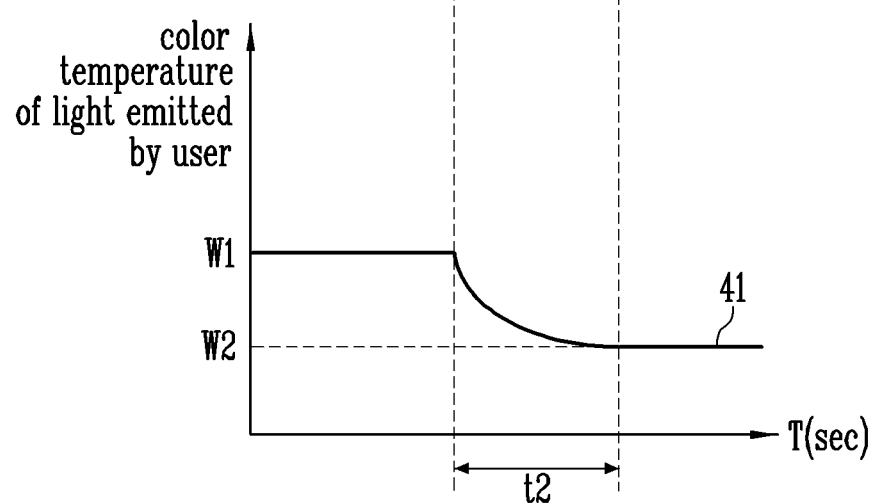

FIG. 12
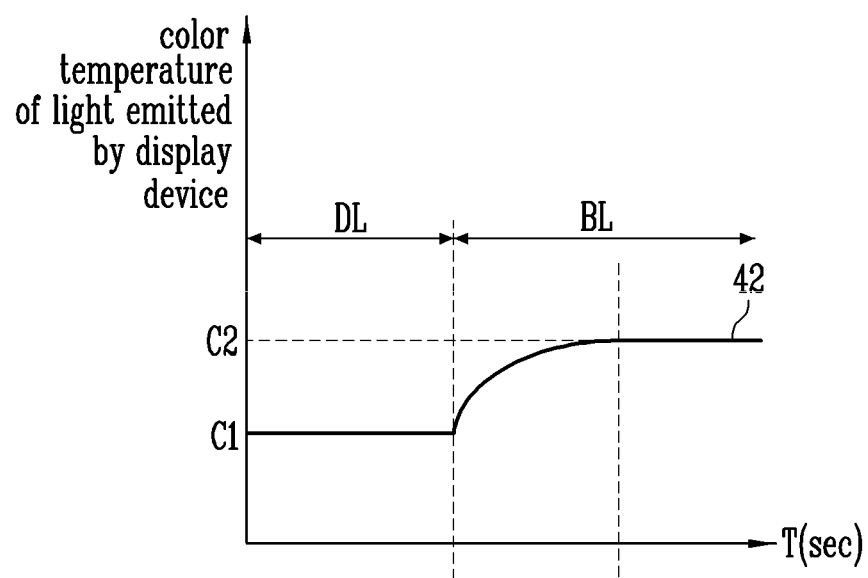
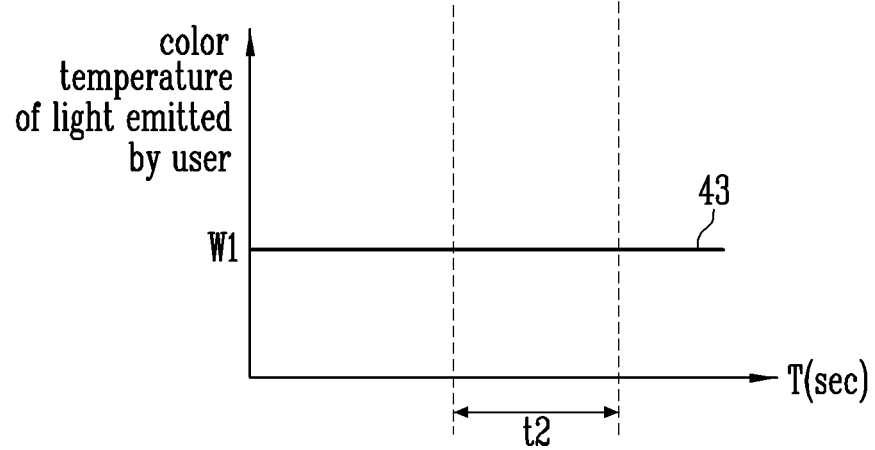

DISPLAY DEVICE

CROSS-REFERENCE TO RELATED APPLICATION

This application claims priority under 35 U.S.C. § 119 to Korean Patent Application No. 10-2023-0124061, filed on Sep. 18, 2023, the entire disclosure of which is incorporated by reference herein in its entirety.

BACKGROUND

1. Field

Embodiments of the present disclosure relates to a display device.

2. Description of the Related Art

Along with the development of information technology, the importance of display devices which helps communication between users and information is emerging. In general, such a display device is a device visually displaying various pieces of information, and is mainly implemented as a liquid crystal display (LCD) device, an organic light-emitting display device, or the like. In addition, as display devices are becoming more common, not only the functions thereof but also the image qualities thereof are considered important. In particular, among the various factors that determine the image quality of a display device, appropriate screen brightness is a factor that cannot be ignored.

A typical display device uses a fixed screen brightness or a screen brightness adjusted by the user. However, when the fixed screen brightness is used, a large amount of power may be unnecessarily consumed when external illumination is high. In addition, higher screen brightness may not be achieved in a darker environment, thereby causing inconvenience in use.

The information disclosed above is only provided for a better understanding of the background of the inventive concepts and should not be taken as an acknowledgment or any form of suggestion that this information forms prior art that would already be known to a person having ordinary skill in the art to which the present disclosure pertains.

SUMMARY

Embodiments of the present disclosure are intended to provide a display device able to control the screen brightness according to the ambient illumination with improved efficiency. For example, the display device may increase or decrease the luminance of pixels during a changed time interval according to the illumination of ambient light.

Other embodiments of the present disclosure are intended to provide a method of driving a display device.

A display device according to an embodiment may include: a display panel including pixels configured to display an image; an illumination sensor configured to measure an illumination of ambient light of the display panel; and a controller configured to control the display panel so that the luminance of the pixels decreases during a first time interval when the illumination of the ambient light decreases and control the display panel so that the luminance of the pixels increases during a second time interval when the illumination of the ambient light increases, wherein the first time interval is shorter than the second time interval.

When the luminance of the image is the same as or higher than a critical value, the second time interval may be at least two times the first time interval.

When the luminance of the image is lower than the critical value, the controller may control the display panel so that the luminance of the pixels decreases during the first time interval when the illumination of the ambient light decreases and controls the display panel so that the luminance of the pixels increases during the second time interval when the illumination of the ambient light increases. When the luminance of the image is higher than or the same as the critical value, the controller may control the display panel so that the luminance of the pixels decreases during a third time interval which different from the length of the first time interval, when the illumination of the ambient light decreases and controls the display panel so that the luminance of the pixels increases during a fourth time interval which is different from the length of the second time interval, when the illumination of the ambient light increases.

The third time interval may be longer than the first time interval. The fourth time interval may be longer than the second time interval.

The display device may further include a memory storing information indicating the first time interval, the second time interval, the third time interval and fourth time interval.

The controller may control the display panel so that the luminance of the pixels changes from a first luminance level to a second luminance level the second luminance level to a third luminance level during the first time interval. The second luminance level may be lower than each of the first luminance level and the third luminance level.

The third luminance level may be lower than the first luminance level.

The difference between the first luminance level and the second luminance level may be greater than the difference between the second luminance level and the third luminance level.

The first time interval may include a first sub-time interval in which the luminance of the pixels changes from the first luminance level to the second luminance level and a second sub-time interval in which the luminance of the pixels changes from the second luminance level to the third luminance level. The first sub-time interval may be shorter than the second sub-time interval.

The controller may control the display panel so that the luminance of the pixels gradually increases from a first luminance level to a second luminance level higher than the first luminance level during the second time interval.

The controller may control the display panel to maintain a level corresponding to luminance of the image when the measured illumination is returned within a predetermined time.

A display device according to another embodiment of the present disclosure may include: a display panel including pixels configured to display an image; an illumination sensor configured to measure a color temperature of ambient light of the display panel; and a controller configured to control the display panel so that the color temperature of the pixels decreases during a first time interval when the color temperature increases and control the display panel so that the color temperature of the pixels increases during a second time interval when the color temperature decreases, wherein the first time interval is shorter than the second time interval.

The controller may control the display panel so that the color temperature of the pixels changes from a first color temperature to a second color temperature and the second color temperature to a third color temperature during the first time interval. The second color temperature may be lower than each of the first color temperature and the third color temperature.

The third color temperature may be lower than the first color temperature.

The difference between the first color temperature and the second color temperature may be greater than the difference between the second color temperature and the third color temperature.

The first time interval may include a first sub-time interval in which the color temperature of the pixels changes from the first color temperature to the second color temperature and a second sub-time interval in which the color temperature of the pixels changes from the second color temperature to the third color temperature. The first sub-time interval may be shorter than the second sub-time time interval.

The controller may control the display panel so that the color temperature of the pixels gradually increases from the first color temperature to the second color temperature higher than the first color temperature during the second time interval.

BRIEF DESCRIPTION OF THE DRAWINGS

FIG. 11 is a graph illustrating an embodiment of changing the color perception of the display panel when the color temperature of ambient light decreases.

FIG. 12 is a graph illustrating an embodiment of the method of controlling the display panel to maintain the estimated color when the color temperature of ambient light decreases.

DETAILED DESCRIPTION OF THE EMBODIMENTS

Hereinafter, exemplary embodiments of the present disclosure will be described in detail with reference to the accompanying drawings. The following description will be focused on only portions required for understanding operations in accordance with the present disclosure, and the descriptions of the other portions will be omitted in order not to unnecessarily obscure the subject matters of the present disclosure. In addition, the present disclosure is not limited to following embodiments but may be implemented in other forms. The following embodiments are provided to fully convey the inventive concepts to a person having ordinary skill in the art to which the present disclosure pertains so that the person could easily practice the inventive concepts.

Throughout the specification, it will be understood that when a part is referred to as being "connected" to another part, not only can it be "directly connected" to the other part, but it can also be "indirectly connected" to the other part via an intervening element. Terms used herein are for the purpose of describing the embodiments and are not intended to limit the present disclosure. It will be understood that the terms "comprise", "include", "have", and any variations thereof used herein are intended to cover non-exclusive inclusions unless explicitly stated to the contrary. "At least one of X, Y, and Z" and "at least one selected from the group consisting of X, Y, and Z" may be construed as each of X, Y, and Z or a combination of two or more of X, Y, and Z (for example, XYZ, XYY, YZ, or ZZ). Here, "and/or" includes one or more combinations of corresponding components.

Terms such as first and second may be used herein to describe various components but are not limited thereto. Each of the terms is used merely to distinguish the corresponding component from other components. Therefore, a first component may be referred to as a second component without departing from the disclosure of the specification.

Figure 1:
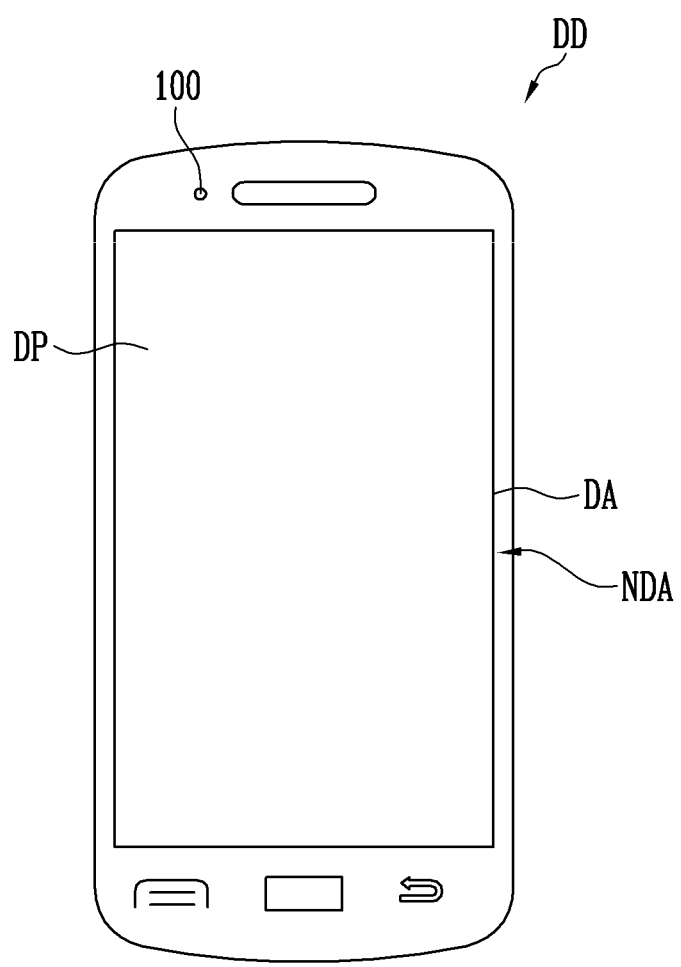
FIG. 1 is schematic diagram illustrating a display device according to embodiments of the present disclosure.

FIG. 1 is schematic diagram illustrating the appearance of a display device according to embodiments of the present disclosure.

Referring to FIG. 1, a display device DD according to embodiments of the present disclosure may include a display panel DP seated on and fastened to a front surface of a body, additional devices provided around the display panel DP to perform predetermined functions, and the like.

The display device DD may be applied to a variety of electronic devices such as a smartphone, a tablet computer, a smart pad, a TV, and a monitor.

In an embodiment, the display panel DP may be a flat display panel or a flexible display panel. For example, the display panel DP may include a rigid substrate made of glass, plastic, or the like or a flexible substrate such as a plastic film. The display panel DP may display an image using a pixel circuit including a plurality of transistors and light-emitting elements such as organic light-emitting diodes (OLEDs) disposed on the substrate. For example, the light-emitting elements may be inorganic light-emitting elements including an inorganic light-emitting material or light-emitting elements generating light by changing the wavelength of emission light using quantum dots (i.e., quantum dot display elements).

The display panel DP may include a display area DA including a plurality of pixels and a non-display area NDA located on at least one side of the display area DA. The entire front surface of the display panel DP may substantially correspond to the display area DA in order to minimize the non-display area NDA (e.g., the bezel). For example, the display area DA may extend to at least one side surface of the display panel DP to realize an edge display. In this case, the non-display area NDA may be present only on a portion of the side surface of the display panel DP.

The additional devices located on the top of the display panel DP may include an illumination sensor 100 configured to measure the ambient brightness. Although it is illustrated in FIG. 1 that the illumination sensor 100 is disposed in the upper left area of the display area DA, the illumination sensor 100 may be disposed in the upper right area or the upper central area of the display area DA.

The illumination sensor 100 may be disposed inside an external system board of the display device DD or may be provided inside the display device DD as a separate circuit or chip.

In addition, although not shown in FIG. 1, other devices such as a camera, a gyro sensor, an acceleration sensor, a geomagnetic sensor, a fingerprint sensor, or a barometric pressure sensor may further be provided in the display device DD on which the display panel DP is disposed.

According to embodiments of the present disclosure, the luminance of the display panel DP may be adjusted according to illumination of external light measured by the illumination sensor 100. A method of changing the luminance of the display panel DP according to changes in the intensity of external light will be described in detail below.

Figure 2:
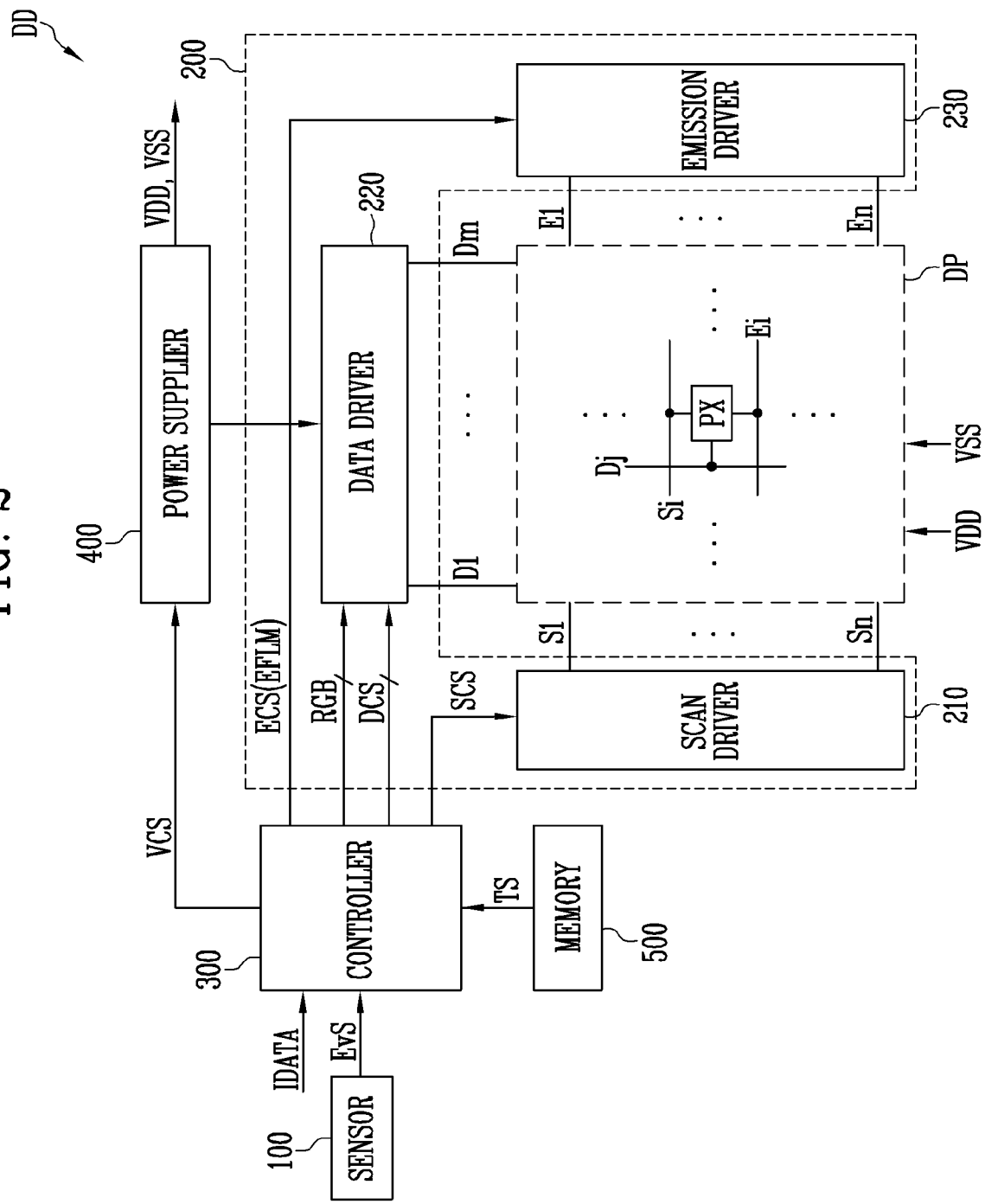
FIG. 2 is a block diagram illustrating the display device illustrated in FIG. 1.

FIG. 2 is a block diagram illustrating the display device illustrated in FIG. 1.

Referring to FIG. 2, the display device DD may include the display panel DP, a display panel driver 200, a controller 300, a power supply 400, and a memory 500. The display panel driver 200 may include a scan driver 210, a data driver 220, and an emission driver 230.

The illumination sensor 100 may detect a change in the illumination environment by measuring the illumination of ambient light of the display device DD. The illumination sensor 100 may measure the illumination and generate illumination data EvS. In addition, the illumination sensor 100 may provide the controller 300 with the illumination data EvS. In embodiments, the illumination sensor 100 may measure the illumination in response to a detection start signal. The detection start signal may be provided by the controller 300 and, for example, may be periodically generated on the basis of a predetermined clock signal. In addition, the illumination sensor 100 may generate the illumination data EvS by increasing or decreasing a voltage or current in response to the increase or decrease of the illumination of ambient light.

The illumination sensor 100 may be a light sensor including a light detecting element such as a transistor or a photodiode. Since the resistance value of the light detecting element changes according to the intensity of light, the light detecting element may recognize the external illumination on the basis of changes in the resistance value. In addition, the illumination sensor 100 may be a colorimeter detecting the color temperature of ambient light.

The display panel DP may include pixels displaying an image. The display panel DP may include the pixels PX connected to data lines D1 to Dm, scan lines S1 to Sn, and emission control lines E1 to En. The pixels PX may be supplied with first drive power VDD and second drive power VSS from an external source.

Specifically, a horizontal line of pixels is selected from the pixels PX in response to a scan signal supplied to one of the scan lines S1 to Sn. Here, each of the pixels PX selected by the scan signal may be supplied with a data signal from one data line (among the data lines D1 to Dm) connected thereto. In response to the data signal, the pixels PX may control the amount of current supplied from the first drive power VDD to the second drive power VSS via the light-emitting elements. Then, each of the pixels PX that have received the data signal may emit light at a predetermined luminance corresponding to the data signal.

The controller 300 may receive an input control signal and input image data IDATA from an image source such as an external graphic device. The controller 300 may generate image data RGB by converting the input image data IDATA into a data which is appropriate for interfacing to the display panel DP on the basis of the input image data IDATA and provide the data driver 220 with the image data RGB. The controller 300 may generate a first control signal SCS for controlling the drive timing of the scan driver 210, a second control signal DCS for controlling the drive timing of the data driver 220, and a third control signal ECS for controlling the drive timing of the emission driver 230 on the basis of the input control signal, and provide the data driver 220, the data driver 220, and the emission driver 230 with the first to third control signals, respectively. In addition, the controller 300 may generate a power control signal VCS on the basis of the input control signal and provide the power supply 400 with the power control signal VCS.

The scan driver 210 may receive the first control signal SCS from the controller 300. The scan driver 210 may supply the scan signals to the scan lines S1 to Sn in response to the first control signal SCS. The first control signal SCS may include a scan start signal and a plurality of clock signals for the scan signal.

Here, the scan signal may have a gate-on level (e.g., a low voltage) corresponding to the type of a transistor to which the corresponding scan signal is supplied. The transistor receiving the scan signal may be turned-on when the scan signal is supplied. For example, the gate-on level (or voltage) of the scan signal supplied to a P-channel metal oxide semiconductor (PMOS) transistor may be a logic low level, while the gate-on level (or voltage) of the scan signal supplied to an N-channel metal oxide semiconductor (NMOS) transistor may be a logic high level.

The data driver 220 may receive the second control signal DCS from the controller 300. The data driver 220 may convert the digital image data RGB into an analog data signals (i.e., a data voltages) in response to the second control signal DCS and supply the data signals to the data lines D1 to Dm.

The emission driver 230 may receive the third control signal ECS from the controller 300. The emission driver 230 may supply an emission control signals to the emission control lines E1 to En in response to the third control signal ECS. The third control signal ECS may include a start signal EFLM and a plurality of clock signals.

Here, the emission control signal may have a gate-off level (e.g., a high voltage). The transistor that has received the emission control signal may be turned off when the emission control signal is supplied and be turned-on in other cases.

Although the scan driver 210 and the emission driver 230 are respectively illustrated as a single configuration for the convenience of description in FIG. 2, the present disclosure is not limited thereto. That is, at least a portion of the scan driver 210 and the emission driver 230 may be embedded in a single integrated chip (IC) or the like.

The power supply 400 may supply the first drive power VDD and the second drive power VSS for driving the pixels PX to the display panel DP. The power supply 400 may generate a voltage of the first drive power VDD and a voltage of the second drive power VSS on the basis of the power control signal VCS. The first drive power VDD is a driving voltage supplied to one electrode of a driver transistor of each of the pixels PX, and may be a high potential voltage. In addition, the second drive power VSS is a common voltage supplied to the cathode of each of the light-emitting elements, and may be a low potential voltage.

The memory 500 may include a lookup table. The lookup table may include information indicating first to fourth time intervals for controlling the display panel DP. The memory 500 may store the lookup table including information regarding the time intervals in which the luminance level is increased or decreased by referring to the luminance measured by the illumination sensor 100 and the luminance of the image on the display panel. In addition, the memory 500 may store the lookup table including information regarding time intervals in which the color temperature is increased or decreased by referring to the color temperature measured by the illumination sensor 100.

As illustrated in FIG. 2, the memory 500 may be provided separately from the controller 300 but may be integrated into the controller 300 as required. For example, the memory 500 may include at least one of a volatile memory (e.g., a dynamic RAM (DRAM), a static RAM (SRAM), or a synchronous dynamic RAM (SDRAM)) or a non-volatile memory (e.g., a programmable ROM (PROM), an erasable and programmable ROM (EPROM), or an electrically erasable and programmable ROM (EEPROM)).

Figure 3:
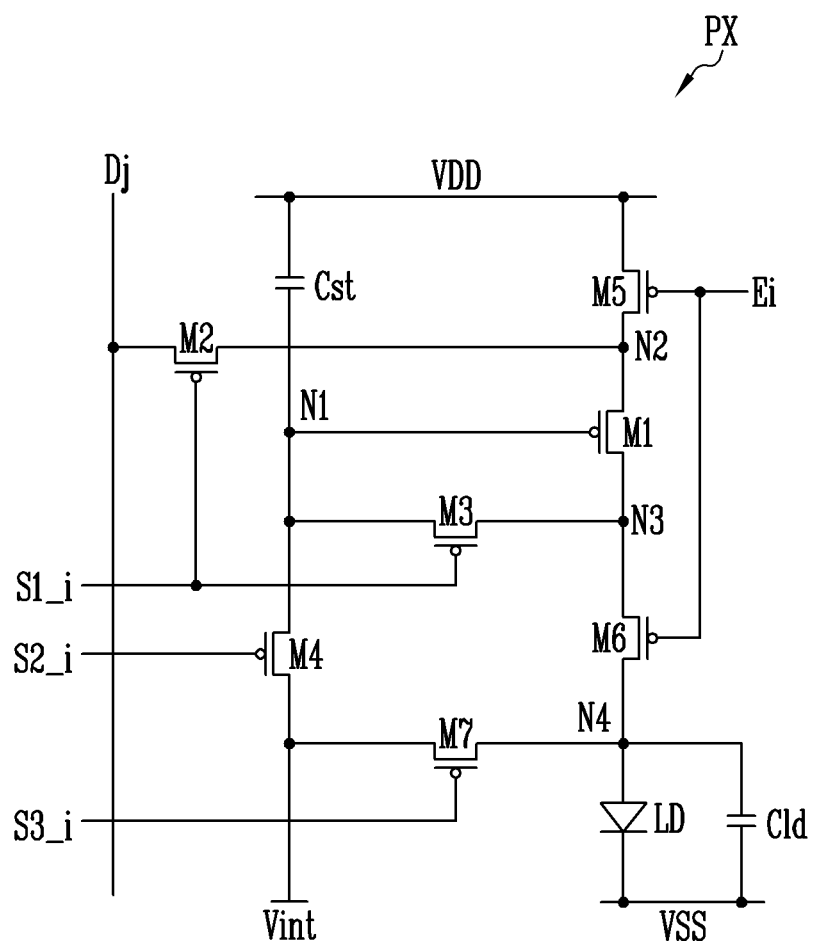
FIG. 3 is a circuit diagram illustrating an embodiment of a pixel included in the display device illustrated in FIG. 2.

FIG. 3 is a circuit diagram illustrating an embodiment of a pixel included in the display device illustrated in FIG. 2.

Referring to FIG. 3, the display panel DP may include a pixel PX connected to an ith horizontal line (or an ith pixel row) and a jth data line Dj (where i and j are natural numbers).

Referring to FIG. 3, the pixel PX may include a light-emitting element LD, first to seventh transistors M1 to M7, and a storage capacitor Cst. In addition, a capacitor Cld connected between the light-emitting element LD and the second drive power VSS in parallel may also be included.

In the light-emitting element LD, a first electrode may be connected to one electrode (i.e., a fourth node N4) of the sixth transistor M6, and a second electrode may be connected to the second drive power VSS. The light-emitting element LD may generate light having a predetermined luminance in response to an amount of current (i.e., driving current) supplied from the first transistor M1.

In an embodiment, the light-emitting element LD may be an organic light-emitting diode (OLED) including an organic light-emitting layer. In another embodiment, the light-emitting element LD may be an inorganic light-emitting element made of an inorganic material. In another embodiment, the light-emitting element LD may be a light-emitting element made of a composite of an inorganic material and an organic material. Alternatively, the light-emitting element LD may be configured such that a plurality of inorganic light-emitting elements are connected between the second drive power VSS and the fourth node N4 in parallel and/or in series.

The capacitor Cld may be connected between the fourth node N4 and the second drive power VSS. The capacitor Cld is a parasitic capacitor able to store a voltage difference between both ends of the light-emitting element LD when the light-emitting element LD generates light.

The first transistor M1 may be connected between a second node N2 and a third node N3. The first transistor M1 may generate drive current and provide the light-emitting element LD with the drive current. A gate electrode of the first transistor M1 may be connected to a first node N1. The first transistor M1 may control an amount of current (i.e., drive current) flowing from the first drive power VDD to the second drive power VSS via the light-emitting element LD on the basis of the voltage of the first node N1. To this end, the first drive power VDD may be set to a voltage higher than the second drive power VSS.

The second transistor M2 may be connected between the jth data line Dj and the second node N2. A gate electrode of the second transistor M2 may be connected to an ith first scan line S1_i. When a first scan signal is supplied to the first scan line S1_i, the second transistor M2 may be turned on to electrically connect the data line Dj and the second node N2.

The third transistor M3 may be connected between the first node N1 and the third node N3. A gate electrode of the third transistor M3 may be connected to the first scan line S1_i. The third transistor M3 may be turned on simultaneously with the second transistor M2.

The fourth transistor M4 may be connected between the first node N1 and an initialization power Vint line. A gate electrode of the fourth transistor M4 may be connected to an ith second scan line S2_i. The fourth transistor M4 may be turned on by a second scan signal supplied to the second scan line S2_i. When the fourth transistor M4 is turned on, a voltage of the initialization power Vint may be supplied to the first node N1 (i.e., the gate electrode of the first transistor M1).

The fifth transistor M5 may be connected between the first drive power VDD and the second node N2. A gate electrode of the fifth transistor M5 may be connected to an ith emission control line Ei. The sixth transistor M6 may be connected between the third node N3 and the light-emitting element LD. A gate electrode of the sixth transistor M6 may be connected to the emission control line Ei. The fifth transistor M5 and the sixth transistor M6 may be turned off when the emission control signal is supplied to the emission control line Ei and be turned on in other cases.

In some embodiments, when the fifth and sixth transistor M5 and M6 are turned on, current flowing through the first transistor M1 may be delivered to the light-emitting element LD to generate light. The emission time of the light-emitting element LD may be determined to correspond to the turn-on time of the fifth and sixth transistors M5 and M6. In addition, the turn-on time of the fifth and sixth transistors M5 and M6 may correspond to the on-duty (i.e., emission time) of the emission control signal, and the turn-off time of the fifth and sixth transistors M5 and M6 may correspond to the off-duty (i.e., non-emission time) of the emission control signal.

The seventh transistor M7 may be connected between the first electrode (i.e., fourth node N4) of the light-emitting element LD and the initialization power Vint line. A gate electrode of the seventh transistor M7 may be connected to an ith third scan line S3_i. The seventh transistor M7 may be turned on by a third scan signal supplied to the third scan line S3_i to supply a voltage of the initialization power Vint to the first electrode of the light-emitting element LD.

The storage capacitor Cst may be connected between the first drive power VDD and the first node N1.

Figure 4:
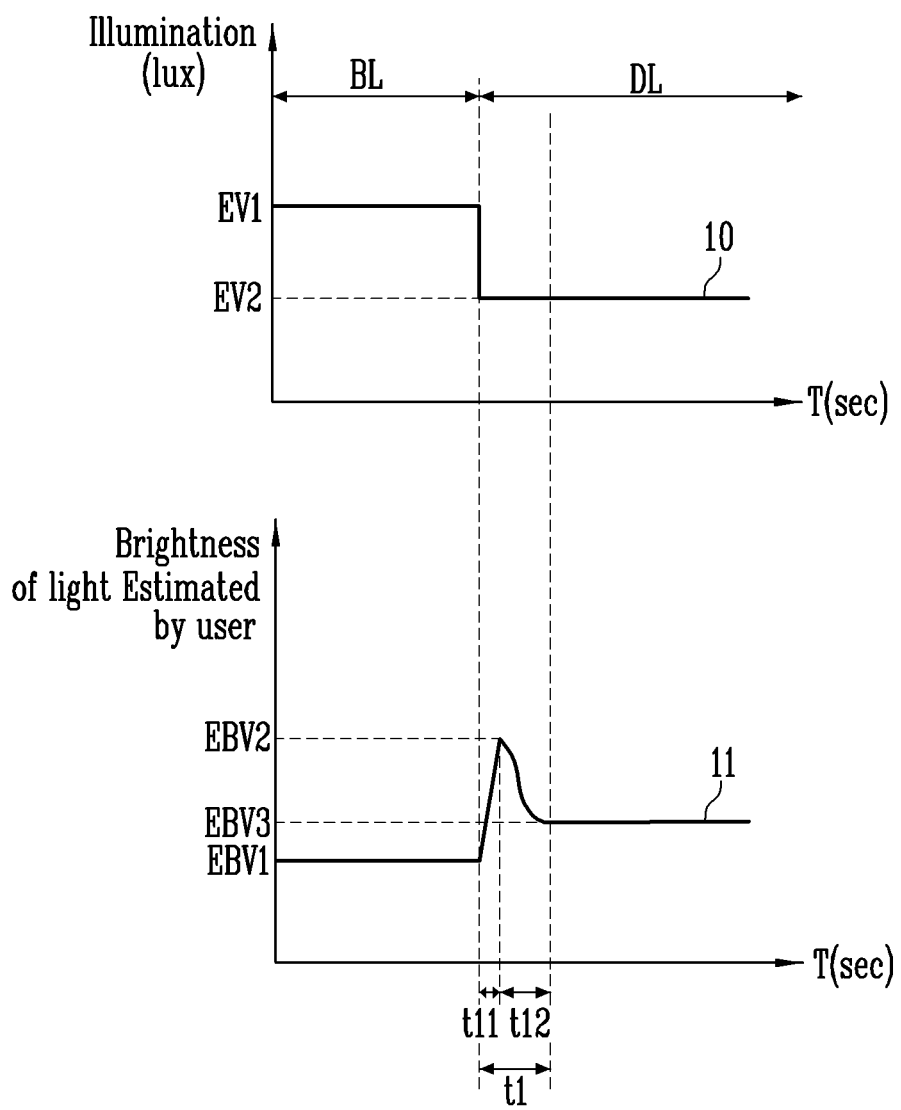
FIG. 4 is a graph illustrating an embodiment of changing the estimated brightness of the display panel when the illumination of ambient light decreases.

FIG. 4 is a graph illustrating an embodiment of changing the estimated brightness of the display panel when the illumination of ambient light decreases.

Hereinafter, with reference to FIG. 4, changes in the estimated brightness of the display panel DP over time with decreases in the illumination of ambient light will be described.

The display device DD may detect the illumination of ambient light using the illumination sensor 100. The illumination may refer to the degree of brightness of a surface of an object when luminous flux from a light source (e.g., the sun, the moon, a fluorescent lamp, an incandescent lamp, or a mercury lamp) is incident on the surface. The unit of the illumination may be lux (or Fc).

As the display device DD is used in daily life, the illumination of the ambient light may decrease in a variety of situations such as when entering a tunnel, when entering a dark room from a bright outside, or when adjusting the color of light to be dark.

The darker ambient light may increase the estimated brightness of the display panel DP (display estimated brightness). Referring to FIG. 4, in a case in which the illumination measured by the illumination sensor 100 decreases, the estimated brightness experienced by a user may increase rapidly and gradually decrease. This may be a phenomenon of dark adaptation by which when a person moves from a bright place to a dark place, the person may not be able to see at first and then gradually recover the vision over time.

Referring to an illumination graph 10, when the ambient light of the display device DD is changed from brighter light BL to darker light DL, the illumination measured by the illumination sensor 100 may decrease from a first illumination EV1 to a second illumination EV2. The brightness (hereinafter, referred to as "estimated brightness") of light generated by the display panel DP and estimated by the user may change according to the illumination graph 10.

Referring to an estimated brightness graph 11, the estimated brightness may be stabilized during a first time interval t1 from a time point at which the illumination is changed from the first illumination EV1 to the second illumination EV2. That is, the estimated brightness may rapidly increase and gradually decrease to a predetermined level. Here, the first time interval t1 may refer to an eye adaptation time taken for dark adaptation.

According to an embodiment, when the illumination decreases, the estimated brightness of the display panel DP may increase from a first estimated luminance level EBV1 to a second estimated luminance level EBV2 during a first sub-time interval t11. Afterwards, the estimated brightness of the display panel DP may stabilize from the second estimated luminance level EBV2 to a third estimated luminance level EBV3 during a second sub-time interval t12. Here, the third estimated luminance level EBV3 may be a level between the first estimated luminance level EBV1 and the second estimated luminance level EBV2.

In addition, the time interval in which the first estimated luminance level EBV1 changes to the second estimated luminance level EBV2 may be a first sub-time interval t11. The time interval in which the second estimated luminance level EBV2 changes to third estimated luminance level EBV3 may be a second sub-time interval t12. The first sub-time interval t11 may be shorter than the second sub-time interval t12.

The first time interval t1 in which the estimated brightness of the display panel DP increases and stabilizes may vary depending on the luminance of an image in the display device DD. When the luminance of the image is the same or higher than a critical value, the first time interval t1 may be longer than when the luminance of the image is lower than the critical value. This may mean that when the display device DD moves from bright light BL to dark light DL, the brighter the image of the display panel DP is, the longer the adaptation time may be.

For example, when the luminance of the image in the display device DD is the same as or higher than a critical value, 100 cd/m², and the illumination measured by the illumination sensor 100 changes from 3500 Lux to 200 Lux or 1000 Lux, the first time interval t1 may be about 60 seconds. In contrast, when the luminance of the image in the display device DD is lower than the critical value, 100 cd/m², and the illumination measured by the illumination sensor 100 changes from 3500 Lux to 200 Lux, the first time interval t1 may be about 40 seconds.

Figure 5:
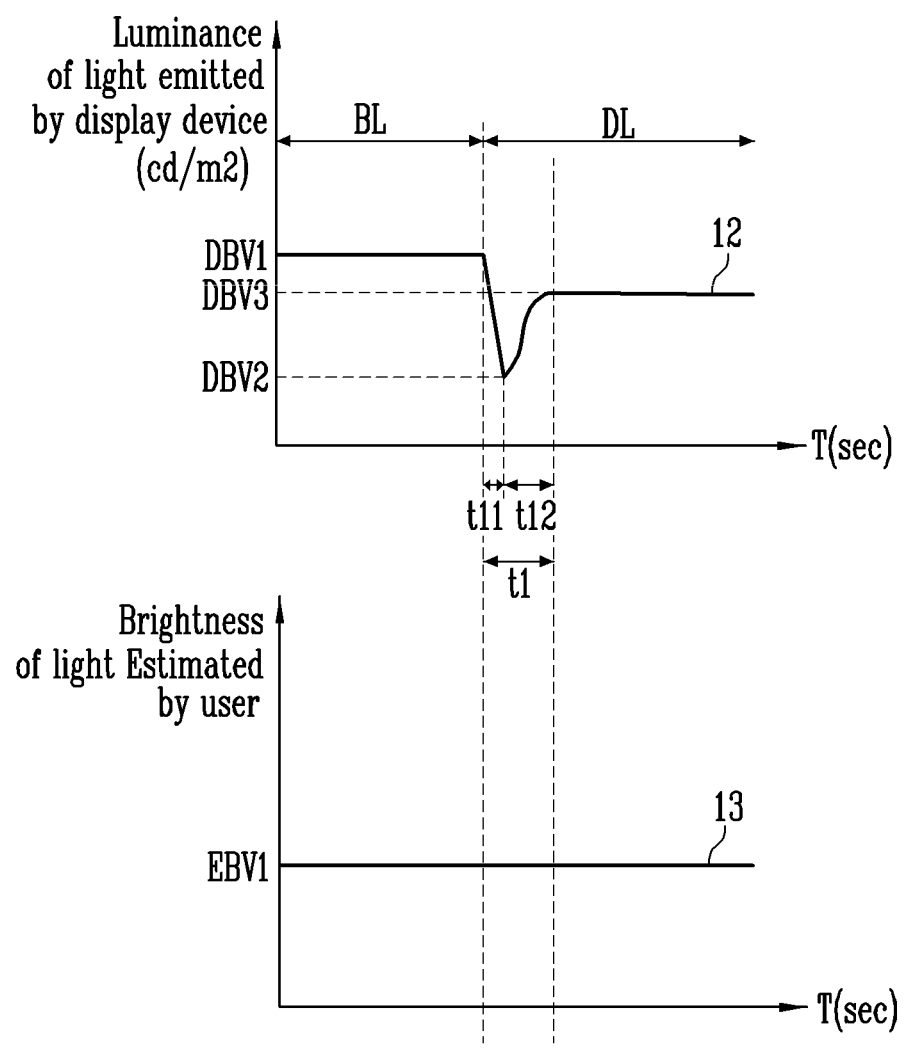
FIG. 5 is a graph illustrating an embodiment of a method of controlling the display panel to maintain the estimated brightness when the illumination of ambient light decreases.

FIG. 5 is a graph illustrating an embodiment of a method of controlling the display panel to maintain the estimated brightness when the illumination of ambient light decreases.

Referring to FIG. 5, the controller 300 may control the display panel DP in response to changes in the estimated brightness of the display panel DP when the illumination of ambient light decrease.

Referring to FIGS. 4 and 5, when the illumination measured by the illumination sensor 100 decreases, the controller 300 may control the display panel so that the luminance of the pixels decreases during the first time interval t1. During the first time interval t1, the controller 300 may control the display panel DP to change the luminance of the pixels from a first luminance level DBV1 to a second luminance level DBV2 during the first sub-time interval t11 and to change the luminance of the pixels from the second luminance level DBV2 to a third luminance level DBV3 during the second sub-time interval t12. Here, the second luminance level DBV2 may be lower than each of the first luminance level DBV1 and the third luminance level DBV3, and the third luminance level DBV3 may be lower than the first luminance level DBV1.

In this manner, the first to third luminance levels DBV1 to DBV3 may be set by considering the first to third estimated luminance levels EBV1 to EBV3 during the first time interval t1 of FIG. 4. Even in the case that the same input image data IDATA is continuously received, the controller 300 may control the display panel driver 200 in response to the illumination data EvS so that light generated by the display panel DP sequentially has the first to third luminance levels DBV1 to DBV3 during the first time interval t1.

The controller 300 may set the luminance levels DBV1 to DBV3 inversely proportional the estimated luminance levels EBV1 to EBV3. For example, the controller 300 may increase the luminance levels DBV1 to DBV3 with decreases in the estimated luminance levels EBV1 to EBV3 and decrease the luminance levels DBV1 to DBV3 with increase the estimated luminance levels EBV1 to EBV3 increase.

The controller 300 may control the luminance of the pixels to change from the first luminance level DBV1 to the second luminance level DBV2 during the first sub-time interval t11. Afterwards, the controller 300 may control the luminance of the pixels again to increase from the second luminance level DBV2 to the third luminance level DBV3 during the second sub-time interval t12. Here, the difference between the first luminance level DBV1 and the second luminance level DBV2 may be greater than the difference between the second luminance level DBV2 and the third luminance level DBV3. In addition, the difference between the first luminance level DBV1 and the second luminance level DBV2 may correspond to the difference between the first estimated luminance level EBV1 and the second estimated luminance level EBV2. The difference between the second luminance level DBV2 and the third luminance level DBV3 may correspond to the difference between the second estimated luminance level EBV2 and the third estimated luminance level EBV3.

In embodiments, the controller 300 may control the luminance of the pixels by adjusting the difference in the voltage between the first drive power VDD and the second drive power VSS. In another embodiment, the controller 300 may control the luminance of the pixels by adjusting the duty ratio of the transistor included in each of the pixels. However, the method of adjusting the luminance level is not limited thereto but may be variously changed.

The controller 300 may control the luminance of the pixels to change from the first luminance level DBV1 to the second luminance level DBV2 during the first sub-time interval t11. In addition, the controller 300 may control the luminance of the pixels to change from the second luminance level DBV2 to the third luminance level DBV3 during the second sub-time interval t12. Here, the controller 300 may set the first sub-time interval t11 and the second sub-time interval t12, in each of which the luminance level of the pixels is changed, so that the first sub-time interval t11 is shorter than the second sub-time interval t12. As described above, even in the case that the illumination of ambient light decreases, the controller 300 may control the luminance according to the time interval in which the estimated luminance level changes, thereby maintaining the estimated brightness of the display panel DP at the first estimated luminance level EBV1. That is, the controller 300 may control the estimated brightness of the display panel DP to appear as an estimated brightness graph 13.

Here, the controller 300 may control the first time interval t1 by setting the first time interval t1 to different values according to the luminance of the image. When the luminance of the image is lower than the critical value, the controller 300 may control the luminance of the pixels to decrease during the first time interval t1 when the illumination decreases. In addition, when the luminance of the image is the same as or higher than the critical value, the controller 300 may control the luminance of the pixels to decrease during a time interval different from the first time interval t1, when the illumination increases. In particular, the controller 300 may control the luminance of the pixels to decrease during a time interval longer than the first time interval t1. When the display device DD moves from the bright light BL to the dark light DL, the controller 300 may set each of the time intervals in which the luminance level is changed so that as the brighter the image of the display panel DP is, the longer the time interval is.

For example, when the luminance of the image in the display device DD is the same as or higher than the critical value, 100 cd/m², and the illumination measured by the illumination sensor 100 changes from 3500 Lux to 200 Lux or 1000 Lux, the controller 300 may set the first time interval t1 to be about 60 seconds. In contrast, when the luminance of the image in the display device DD is lower than the critical value 100 cd/m² and the illumination measured by the illumination sensor 100 changes from 3500 Lux to 200 Lux, the controller 300 may set the third time interval t3 to be about 40 seconds.

As described above, when the illumination of ambient light decreases, the controller 300 may control the luminance level of the pixel in predetermined different time intervals according to the luminance of the image. The display device DD may maintain the estimated brightness of the display panel DP to be the same as before the illumination of ambient light decreases, thereby reducing deteriorations in image quality and more efficiently improving the visibility of images displayed on the display panel DP.

In addition, even in the case that the illumination measured by the illumination sensor 100 decreases, when the illumination is returned within a predetermined time, the controller 300 may control the display panel DP to maintain the luminance of the image. For example, the controller 300 may set the time in which the luminance level is maintained so that the luminance level of the pixels is not changed by a temporary shadow cast on the illumination sensor 100 or the like. Even in the case that the illumination measured by the illumination sensor 100 decreases, when the illumination is returned within a predetermined time from the time point at which the illumination is changed, the controller 300 may control the luminance level of the pixels to be maintained at the level corresponding to the luminance of the image. As described above, the display device DD may be controlled so as to distinguish undesired instantaneous changes in brightness. Accordingly, the display device DD may prevent malfunctions that would otherwise occur by sensitive reactions whenever the illumination of ambient light decreases.

Figure 6:
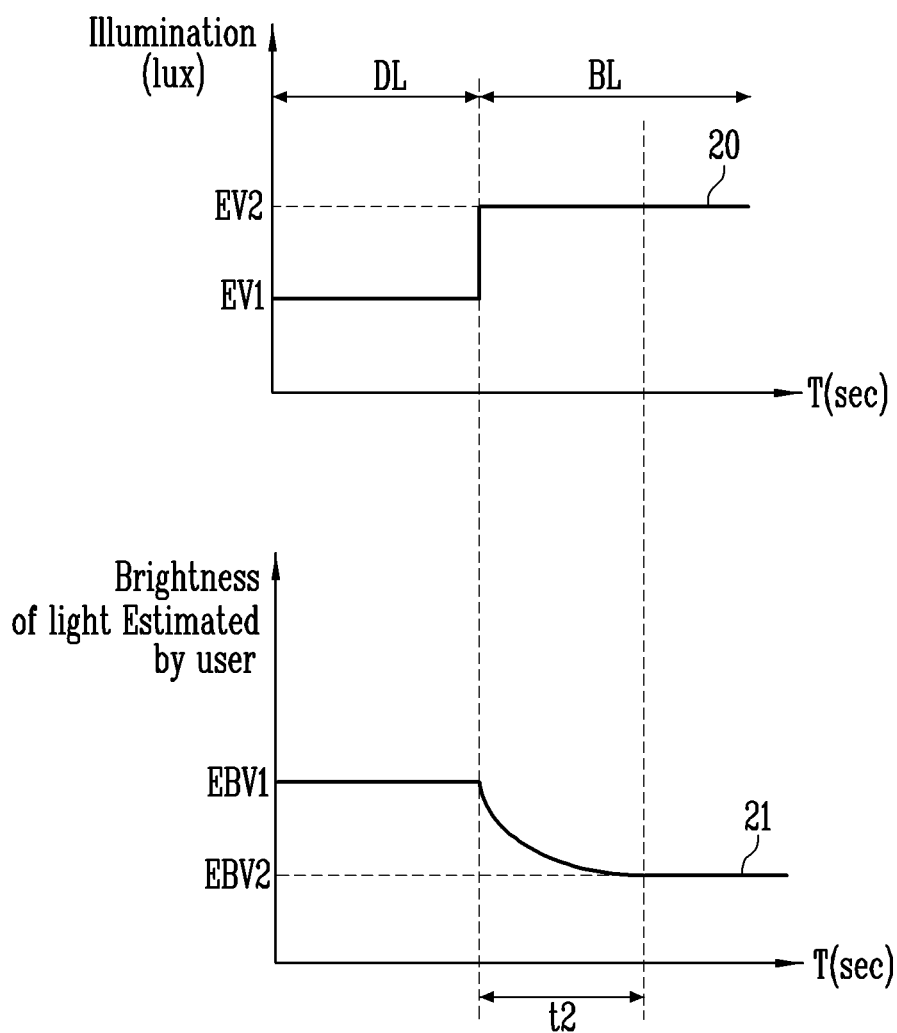
FIG. 6 is a graph illustrating an embodiment of changing the estimated brightness of the display panel when the illumination of ambient light increases.

FIG. 6 is a graph illustrating an embodiment of changing the estimated brightness of the display panel when the illumination of ambient light increases.

Hereinafter, with reference to FIG. 6, changes in the estimated brightness of the display panel DP over time when the illumination of ambient light increases will be described.

As the display device DD is used in daily life, the illumination of the ambient light may increase in a variety of situations such as when exiting a tunnel, when entering a bright room from a dark outside, or when adjusting the color of light to be bright.

The brighter ambient light may decrease the estimated brightness of the display panel DP (or display estimated brightness). Referring to FIG. 6, in a case in which the illumination measured by the illumination sensor 100 increases, the estimated brightness experienced by a user may stabilize by gradually decreasing. This may be a phenomenon of bright adaptation by which when a person moves from a dark place to a bright place, the person may not be able to see at first and then gradually recover the vision over time.

Referring to an illumination graph 20, when the ambient light of the display device DD is changed from darker light DL to brighter light BL, the illumination measured by the illumination sensor 100 may increase from a first illumination EV1 to a second illumination EV2. The brightness (hereinafter, referred to as "estimated brightness") of light generated by the display panel DP and estimated by the user may change according to the illumination graph 20. Referring to an estimated brightness graph 21, the estimated brightness may stabilize by gradually decreasing during a second time interval t2 from a time point at which the estimated brightness is changed from the first illumination EV1 to the second illumination EV2. That is, the second time interval t2 may be taken until the estimated brightness stabilizes again by darkening to a predetermined level. Here, the second time interval t2 may refer to an eye adaptation time taken for bright adaptation.

According to an embodiment, when the illumination increases, the estimated brightness of the display panel DP may stabilize by gradually decreasing from a first estimated luminance level EBV1 to a second estimated luminance level EBV2 from the time point at which the illumination is changed. Here, the second estimated luminance level EBV2 may be lower than the first estimated luminance level EBV1.

In addition, the time interval in which the first estimated luminance level EBV1 changes to the second estimated luminance level EBV2 may be the second time interval t2. In addition, When the illumination increases, the second time interval t2 may be taken longer than the first time interval t1 which is the time interval in which the luminance level stabilizes by being changed when the illumination decreases.

The display device DD may set the second time interval t2, in which the estimated brightness of the display panel DP stabilizes by increasing, to different values according to the luminance of the image. When the luminance of the image is the same as or higher than the critical value, the second time interval t2 may be taken longer than when the luminance of the image is lower than the critical value. This may mean that when the display device DD moves from dark light DL to bright light BL, the brighter the image of the display panel DP is, the longer the adaptation time may be.

For example, when the luminance of the image in the display device DD is the same as or higher than a critical value 100, cd/m$^2$, and the illumination measured by the illumination sensor 100 changes from 200 Lux to 3500 Lux, the first time interval t1 may be about 150 seconds. In addition, when the illumination changes from 1000 Lux to 3500 Lux, the first time interval t1 may be about 70 seconds. In contrast, when the luminance of the image in the display device DD is lower than the critical value, 100 cd/m$^2$, and the illumination measured by the illumination sensor 100 changes from 200 Lux to 3500 Lux, the first time interval t1 may be about 90 seconds.

Figure 7:
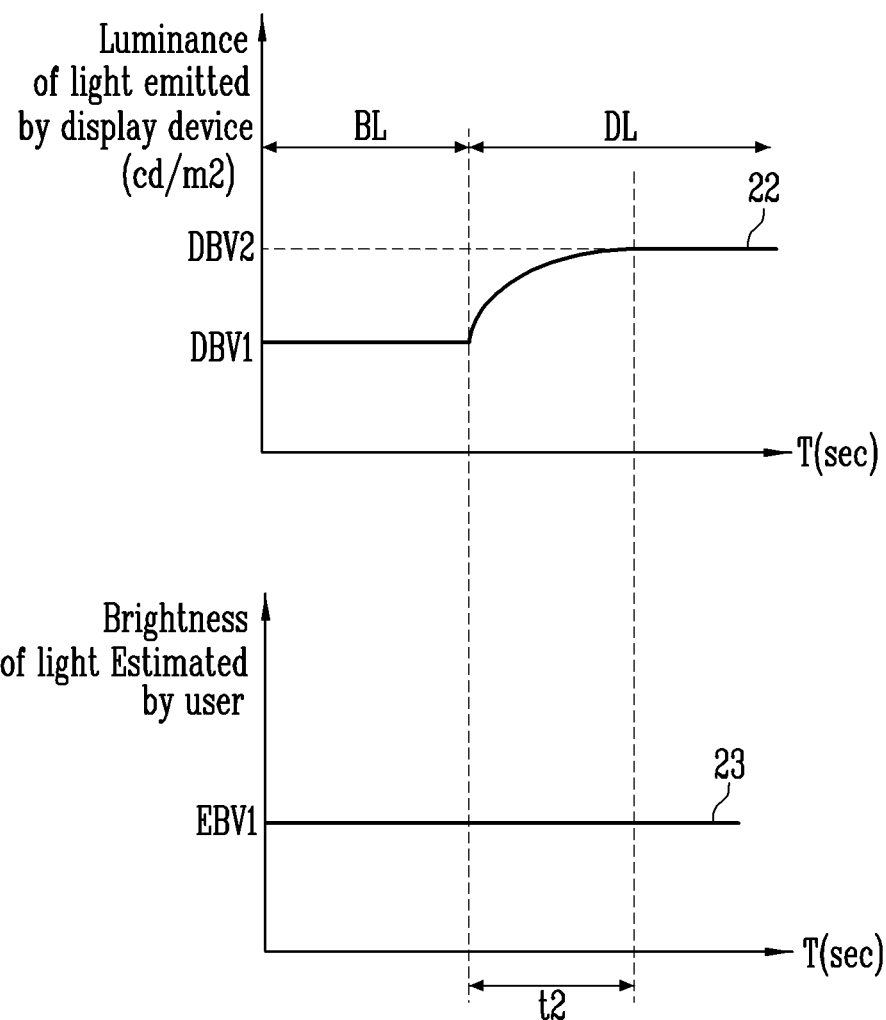
FIG. 7 is a graph illustrating an embodiment of the method of controlling the display panel to maintain the estimated brightness when the illumination of ambient light increases.

FIG. 7 is a graph illustrating an embodiment of the method of controlling the display panel to maintain the estimated brightness when the illumination of ambient light increases.

Referring to FIG. 7, the controller 300 may control the display panel DP in response to changes in the estimated brightness of the display panel DP as the illumination of ambient light increases.

Referring to FIGS. 6 and 7, when the illumination measured by the illumination sensor 100 increases, the controller 300 may control the display panel so that the luminance of the pixels increases during the second time interval t2. During the second time interval t2, the controller 300 may control the display panel DP to change the luminance of the pixels from a first luminance level DBV1 to a second luminance level DBV2. Here, the second luminance level DBV2 may be higher than that of the first luminance level DBV1.

As described above, first and second luminance levels DBV1 and DBV2 may be set by considering first and second estimated luminance levels EBV1 and EBV2 during the second time interval t2 in FIG. 6. Even in the case that the same input image data IDATA is continuously received, the controller 300 may control the display panel driver 200 in response to the illumination data EvS so that light generated by the display panel DP sequentially has the first and second luminance levels DBV1 and DBV2 during the second time interval t2.

The controller 300 may set the luminance levels DBV1 and DBV2 inversely proportional to the estimated luminance levels EBV1 and EBV2. For example, the controller 300 may increase the luminance levels DBV1 and DBV2 in proportional to decrease in the estimated luminance levels EBV1 and EBV2.

The controller 300 may control the luminance of the pixels to increase from first luminance level DBV1 to the second luminance level DBV2 from the time point at which the illumination is changed. Here, the difference between the first luminance level DBV1 and the second luminance level DBV2 may correspond to the difference between the first estimated luminance level EBV1 and the second estimated luminance level EBV2.

In embodiments, the controller 300 may control the luminance of the pixels by adjusting the difference in the voltage between the first drive power VDD and the second drive power VSS. In another embodiment, the controller 300 may control the luminance of the pixels by adjusting the duty ratio of the transistor included in each of the pixels. However, the method of adjusting the luminance level is not limited thereto but may be variously changed.

The controller 300 may control the luminance of the pixels so that the slope corresponding to the variation of the luminance level DBV per hour gradually decreases during the second time interval t2. The controller 300 may perform the controlling so that the variation of the luminance level per hour gradually decreases as getting closer to the second luminance level DBV2.

As described above, even in the case that the illumination of ambient light increases, the controller 300 may control the luminance according to the time interval in which the estimated luminance level is changed, thereby maintaining the estimated brightness of the display panel DP at the first estimated luminance level EBV1. That is, the controller 300 may control the estimated luminance of the display panel DP to appear as an estimated brightness graph 23.

Here, the controller 300 may control the second time interval t2 by setting the second time interval t2 to different values according to the luminance of the image. When the luminance of the image is lower than the critical value, the controller 300 may control the luminance of the pixels to increase during the second time interval t2 when the illumination increases. In addition, when the luminance of the image is the same as or higher than the critical value, the controller 300 may control the luminance of the pixels to increase during a time interval different from that of the second time interval t2, when the illumination increases. In particular, the controller 300 may control the luminance of the pixels to decrease during a time interval longer than the second time interval t2. When the display device DD moves from the dark light DL to the bright light BL, the controller 300 may set the time intervals, in each of which the luminance level is changed, so that as the brighter the image of the display panel DP is, the longer the adaptation time is.

For example, when the luminance of the image in the display device DD is the same as or higher than the critical value, 100 cd/m$^2$, and the illumination measured by the illumination sensor 100 changes from 200 Lux to 3500 Lux, the controller 300 may set the second time interval t2 to be about 150 seconds. When the illumination changes from 1000 Lux to 3500 Lux, the controller 300 may set the second time interval t2 to be about 70 seconds. In contrast, when the luminance of the image in the display device DD is lower than the critical value, 100 cd/m$^2$, and the illumination measured by the illumination sensor 100 changes from 200 Lux to 3500 Lux, the controller 300 may set the second time interval t2 to be about 90 seconds.

In particular, when the luminance of the image is the same as or higher than the critical value, the controller 300 may set the second time interval t2, in which the luminance is controlled to increase with increases in the illumination, to be at least two times the first time interval t1, in which the luminance is controlled to decrease with decreases in the illumination. For example, when the luminance of the image in the display device DD is the same as or higher than the critical value, 100 cd/m$^2$, the controller 300 may control the luminance to decrease for about 60 seconds according to the illumination decreasing from 3500 Lux to 200 Lux. In contrast, the controller 300 may control the luminance to increase for about 150 seconds, i.e., at least two times about 60 seconds, according to the illumination increasing from 200 Lux to 3500 Lux.

As described above, the controller 300 may control the luminance level of the pixels in predetermined time intervals according to the luminance of the image when the illumination of ambient light increases. The display device DD may maintain the estimated luminance of the display panel DP to be the same as before the illumination of ambient light decreases, thereby reducing deteriorations in image quality and more effectively improving the visibility of the image displayed on the display panel DP.

In addition, even in the case that the illumination measured by the illumination sensor 100 increases, when the illumination is returned within a predetermined time, the controller 300 may control the display panel DP to maintain the luminance of the image. For example, even in the case that the illumination measured by the illumination sensor 100 increases, when the illumination is returned within a predetermined time from the time point at which the illumination is changed, the controller 300 may control the luminance level of the pixels to be maintained at the luminance of the image. As described above, the display device DD may be controlled so as to distinguish undesired instantaneous changes in brightness. Accordingly, the display device DD may prevent malfunctions that would otherwise occur by sensitive reactions whenever the illumination of ambient light increases.

Figure 8:
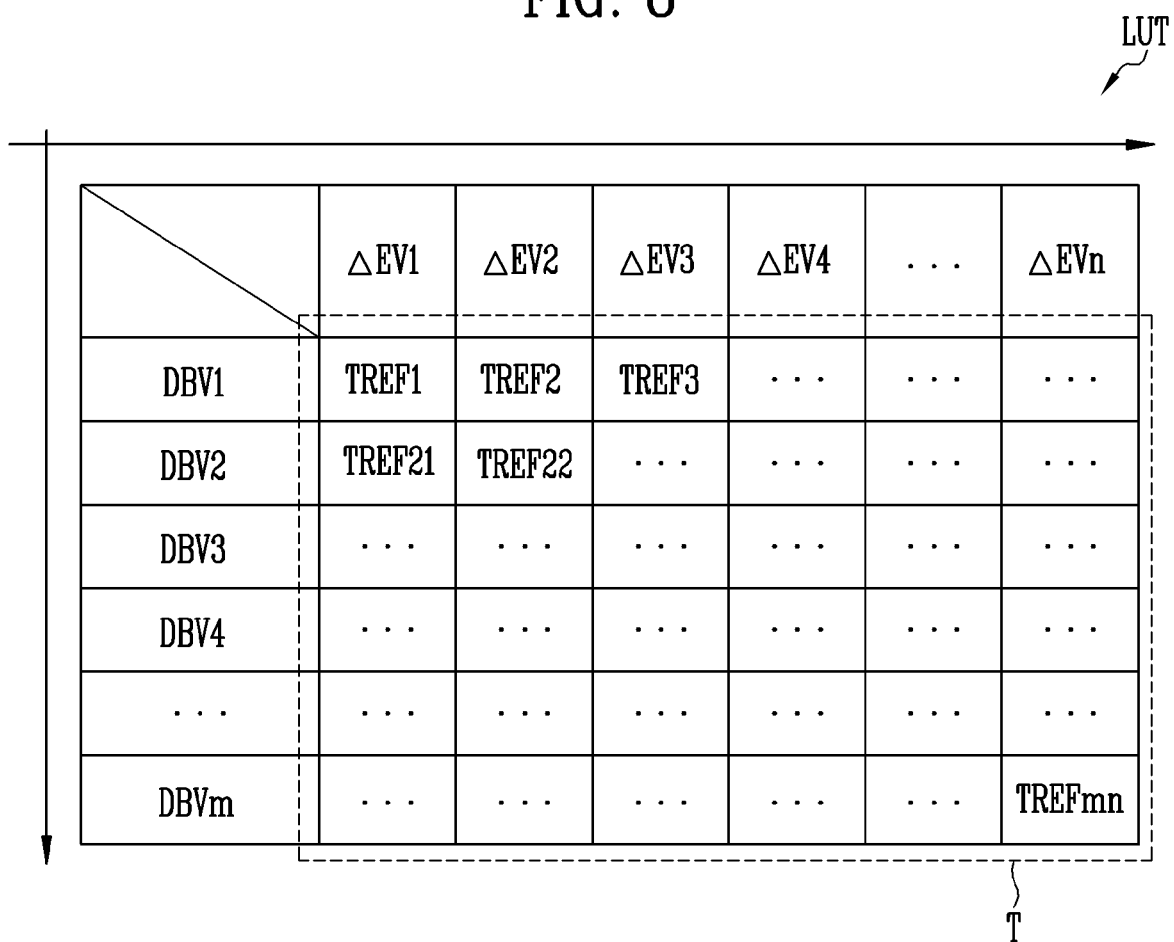
FIG. 8 is a diagram illustrating an embodiment of a lookup table in which information indicating time sections is stored.

FIG. 8 is a diagram illustrating an embodiment of the lookup table in which information indicating time sections is stored.

Referring to FIG. 8, the display device DD illustrated in FIG. 2 may include a memory storing respective time intervals T in which the luminance of the pixels is controlled to decrease or increase with changes in the illumination with respect to the luminance of the image. In addition, the memory may store one or more time intervals T in the form of a lookup table LUT.

According to an embodiment, the lookup table LUT may include time intervals TREF1 to TREFmn corresponding to one or more illumination variations ΔEV1 to ΔEVn, respectively, in relation to luminance levels DBV1 to DBVm corresponding to the luminance of the image. In embodiments, each of the luminance levels may refer to an average luminance level of the entire data pixels of the input image data IDATA (see FIG. 2). In other embodiments, each of the luminance levels may refer to an average luminance level of some of the data pixels of the input image data IDATA (see FIG. 2). In addition, each of the luminance levels may be determined from the input image data IDATA using a variety of methods known in the art to which the present disclosure pertains.

The time intervals TREF1 to TREFmn may be values experimentally determined according to one or more illumination variations ΔEV1 to ΔEVn in relation to each of the luminance levels.

For example, in the lookup table LUT stored in the memory, respective time intervals TREF1 to TREFmn may be set as eye adaptation times measured according to the luminance levels and the illumination variations of the image. Specifically, each of the time intervals TREF1 to TREFmn may be determined from changes in the estimated luminance of the display panel DP measured over time by changing the illumination of ambient light to decrease or increase in each of the luminance levels of the image. Each of the time intervals may be optimized in luminance level and illumination conditions of the corresponding image in order to maintain the estimated luminance of the display panel DP.

In addition, the lookup table LUT stored in the memory may be periodically updated. The elements included in the pixel PX may deteriorate over time. Thus, the lookup table LUT stored in the memory before shipment of a product may be periodically updated to optimize each of the time intervals TREF1 to TREFmn changing according to the deterioration of the elements. For example, the update cycle of the lookup table LUT may be set to a time period in which deterioration may occur. The cycle may be 1000 hours but is not limited thereto.

As illustrated in FIG. 8, in the lookup table LUT, the time intervals TREF1 to TREFmn may be stored according to the luminance level and the illumination variation of the image.

Figure 9:
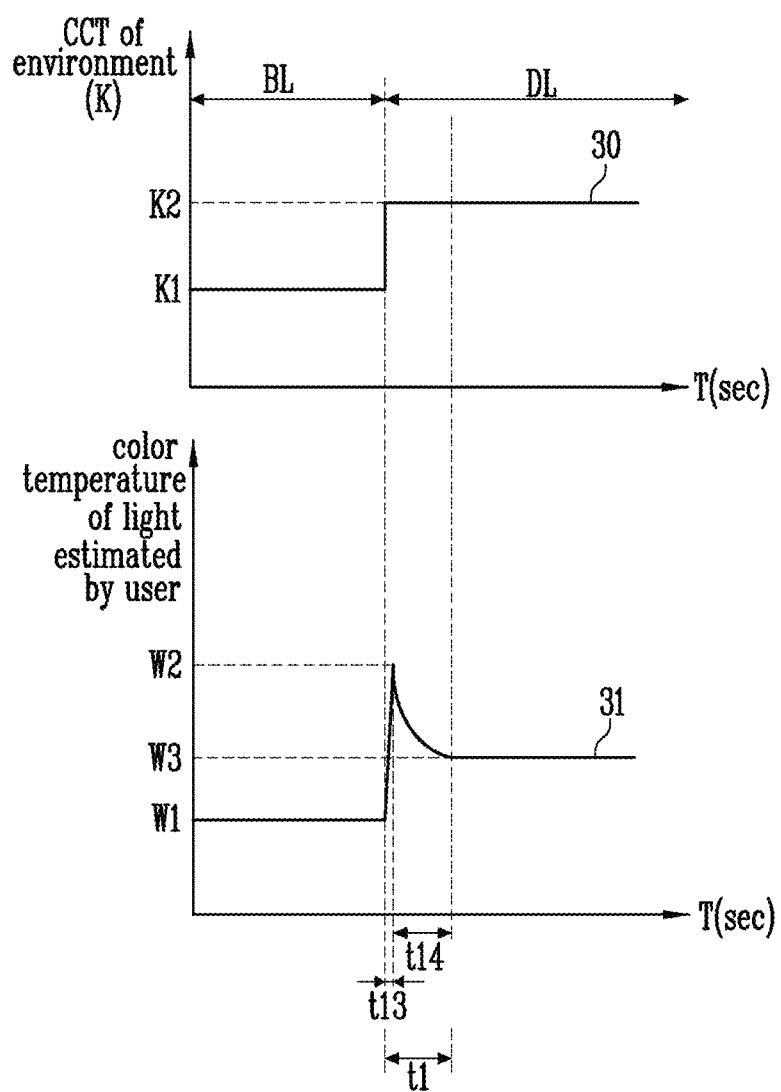
FIG. 9 is a graph illustrating an embodiment of changing the color perception of the display panel when the color temperature of ambient light increases.

FIG. 9 is a graph illustrating an embodiment of changing the color perception of the display panel when the color temperature of ambient light increases With reference to FIG. 9, when the color temperature of ambient light increases, changes in the color perception of the display panel DP over time may be explained.

The display device DD may detect the color temperature of ambient light using the illumination sensor 100. The illumination sensor 100 may be a sensor designed to be able to distinguish light sources including the sunlight, filament light, fluorescent light, LED light, and the like and to distinguish color temperatures from 2,000K to 10,000K. However, the method of detecting the color temperature is not limited thereto.

Specifically, the color temperature is a parameter describing the color of light radiated from a light source as a temperature. The temperature of a black body characterized by radiating different colors of light according to the temperature may be defined as color temperature. In addition, the color temperature may be expressed in units of absolute temperature, Kelvin (K). In addition, correlated color temperature (CCT) may refer to the approximated color temperature of each of the light sources that deviate somewhat from the trajectory of the black body. In addition, in the display device DD, the CCT may be used to mean the color temperature, and may be indicated using a light source color or a white point.

As the display device DD is used in daily life, the color of an obtained image may be estimated differently from what is actually seen, due to the influence of the color temperature. For example, when the color temperature of ambient light increases, the image of the display device DD may be estimated as blue. As the color temperature increases, light radiated from the light source tends to be estimated as blue since the blue (B) component is more than the red (R) component in the entire RGB distribution of the light.

In this regard, the higher the color temperature of ambient light is, the higher the estimated color temperature (or standard white index) of the display panel DP estimated by the user may be. Here, the standard white index is a numerical value indicating the tone of color of standard white. The standard white index may be the color appearance of the display panel DP. However, as illustrated in FIG. 9, when the ambient color temperature increases in response to a change in lighting as when moving from a place below an incandescent lamp (3000K) to a place below an LED lamp (6500K), the estimated color temperature of the display panel DP may stabilize by gradually decreasing after rapidly increasing. This may be a phenomenon of color adaptation in response to a change in the color temperature.

Referring to an ambient color temperature graph 30, when the ambient light of the display device DD is changed from brighter light BL to darker light DL, the color temperature measured by the illumination sensor 100 may increase from a first temperature K1 to a second temperature K2. The estimated color temperature generated by the display panel DP and estimated by the user may change on the ambient color temperature graph 30.

Referring to an estimated color temperature graph 31, the estimated color temperature may increase and stabilize during a first time interval t1 from a time point at which the temperature is changed from the first temperature K1 to the second temperature K2. More specifically, the estimated color temperature may rapidly increase during the first sub-time interval t13 and be gradually stabilized during the second sub-time interval t14. That is, the first time interval t1 may be taken until the color appearance of the display panel DP gradually stabilizes to a predetermined level after being immediately estimated as bluer. Here, the first time interval t1 may refer to an eye adaptation time taken for color adaptation.

According to an embodiment, when the ambient color temperature increases, the estimated color temperature of the display panel DP may increase from a first estimated color temperature W1 to a second estimated color temperature W2 from a time point at which the ambient color temperature is changed. Afterwards, the estimated color temperature of the display panel DP may stabilize again by decreasing from the second estimated color temperature W2 to a third estimated color temperature W3. Here, the third estimated color temperature W3 may be between the first estimated color temperature W1 and the second estimated color temperature W2.

In addition, the time interval in which the first estimated color temperature W1 is changed to the second estimated color temperature W2 may be a first sub-time interval t13. In addition, the time interval in which the second estimated color temperature W2 is changed to the third estimated color temperature W3 may be a second sub-time interval t14. The first sub-time interval t13 may be shorter than the second sub-time interval t14.

Figure 10:
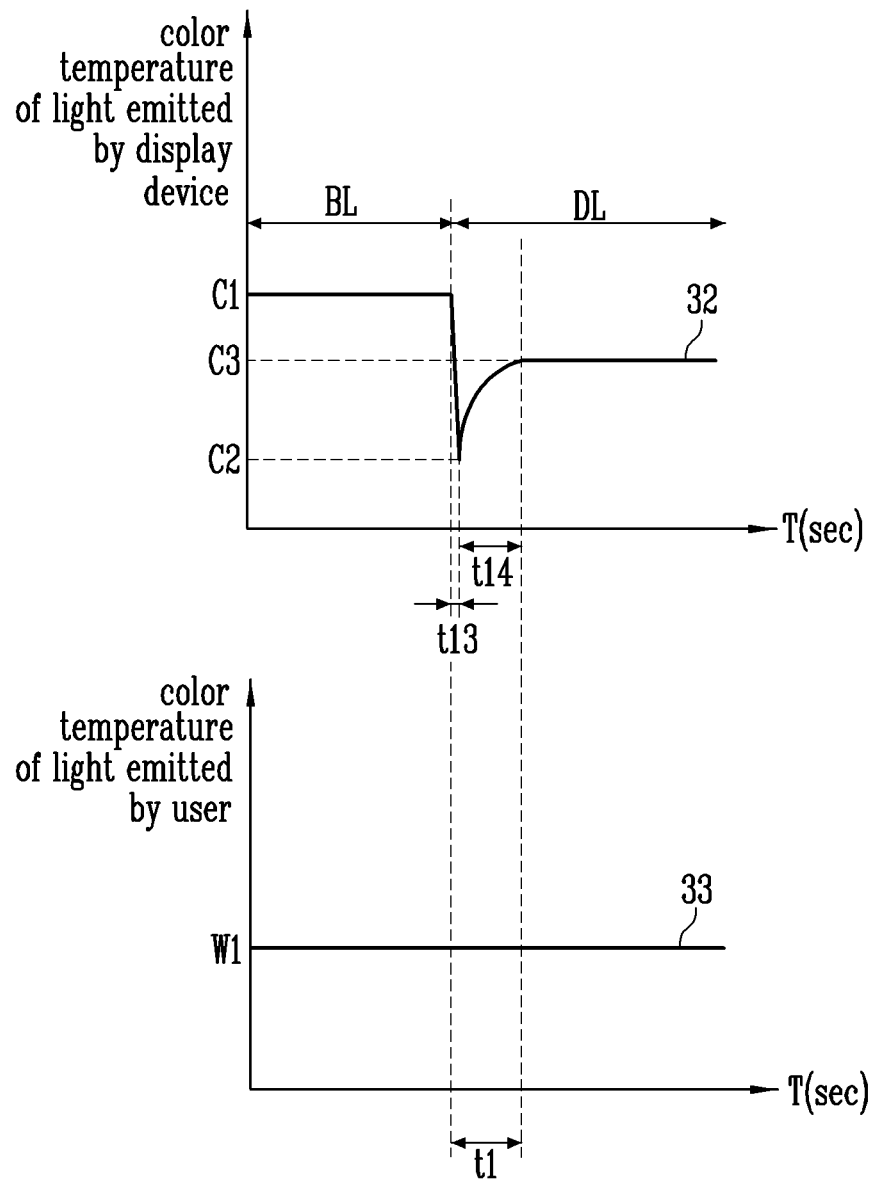
FIG. 10 is a graph illustrating an embodiment of the method of controlling the display panel to maintain the estimated color when the color temperature of ambient light increases.

FIG. 10 is a graph illustrating an embodiment of the method of controlling the display panel to maintain the estimated color when the color temperature of ambient light increases.

Referring to FIG. 10, the controller 300 may control the display panel DP in response to the estimated color temperature of the display panel DP as the color temperature of ambient light increases. Here, it will be assumed that white input image data IDATA is received for the convenience of description.

Referring to FIGS. 9 and 10, when the ambient color temperature measured by the illumination sensor 100 increases, the controller 300 may control the display panel so that the color temperature (or color coordinates) of light emitted by the pixels decreases during the first time interval t1. During the first time interval t1, the controller 300 may control the display panel DP to change the color temperature of the pixels from a first color temperature C1 to a second color temperature C2 and to change the color temperature of the pixels from the second color temperature C2 to a third color temperature C3. Here, the second color temperature C2 may be lower than each of the first color temperature C1 and the third color temperature C3, while the third color temperature C3 may be lower than the first color temperature C1.

As described above, the first to third color temperatures C1 to C3 may be set by considering the first to third estimated color temperatures W1 to W3 during the first time interval t1 in FIG. 10. Even in the case that the same input image data IDATA is continuously received, the controller 300 may control the display panel driver 200 so that light generated by the display panel DP sequentially has the first to third color temperatures C1 to C3 during the first time interval t1 in response to the illumination data EvS including the ambient color temperature data.

The controller 300 may set the color temperatures C1 to C3 of the pixels inversely proportional to the th estimated color temperatures W1 to W3. The color temperatures C1 to C3 of the pixels may increase when the estimated color temperatures W1 to W3 decrease and may decrease when the estimated color temperatures W1 to W3 increase.

The controller 300 may control the color temperature of the pixels to decrease from the first color temperature C1 to the second color temperature C2 during the first sub-time interval t13 from a time point at which the ambient color temperature is changed. Afterwards, the controller 300 may control the color temperature of the pixels again to increase from the second color temperature C2 to the third color temperature C3 during the second sub-time interval t14. Here, the difference between the first color temperature C1 and the second color temperature C2 may be greater than the difference between the second color temperature C2 and the third color temperature C3.

In embodiments, the controller 300 may control the color temperature of the pixels by adjusting a drive control signal according to an RGB signal corresponding to the first color temperature C1, the second color temperature C2, or the third color temperature C3. That is, the drive control signal may be adjusted according to the color temperature variation. However, the method of adjusting the color temperature is not limited thereto but may be variously changed.

The controller 300 may control the color temperature of the pixels to change from the first color temperature C1 to the second color temperature C2 during the first sub-time interval t13. In addition, the controller 300 may control the color temperature of the pixels to change from the second color temperature C2 to the third color temperature C3 during the second sub-time interval t14. Here, the controller 300 may set the first sub-time interval t13, in which the color temperature of the pixels is changed, to be shorter than the second sub-time interval t14. As described above, even in the case that the color temperature of ambient light increases, the controller 300 may control the color temperature according to the time interval in which the estimated color temperature is changed, thereby maintaining the estimated color temperature of the display panel DP at the first estimated color temperature W1. That is, the controller 300 may control the estimated color temperature of the display panel DP to appear as an estimated color temperature graph 33.

As described above, when the color temperature of ambient light increases, the controller 300 may control each of the pixels so that light having the adjusted color temperature (or color coordinates) is generated according to the estimated color temperature in a predetermined time interval. The display device DD may maintain the estimated color temperature of the display panel DP to be the same as before the color temperature of ambient light increases, thereby improving the image quality of the display panel DP and minimizing visual fatigue of the user.

FIG. 11 is a graph illustrating an embodiment of changing the color perception of the display panel when the color temperature of ambient light decreases.

Referring to FIG. 11, when the color temperature of ambient light decreases, changes in the color perception of the display panel DP over time may be described.

As the display device DD is used in daily life, the color of an obtained image may be estimated differently from what is actually seen due to the influence of the color temperature. For example, when the color temperature of ambient light decreases, the image of the display device DD may be estimated as red. With decreases in the color temperature, light radiated from the light source tends to be estimated as red since the red (R) component is more than the blue (B) component in the entire RGB distribution of the light.

The lower the color temperature of ambient light is, the lower the estimated color temperature (or standard white index) of the display panel DP estimated by the user may be. However, as illustrated in FIG. 11, when the ambient color temperature decreases in response to a change in lighting as when moving from a place below an LED lamp (6500K) to a place below an incandescent lamp (3000K), the estimated color temperature of the display panel DP may stabilize by gradually increasing. This may be a phenomenon of color adaptation in response to a change in the color temperature.

Referring to an ambient color temperature graph 40, when the ambient light of the display device DD is changed from darker light DL to brighter light BL, the color temperature measured by the illumination sensor 100 may decrease from a first temperature K1 to a second temperature K2. The estimated color temperature generated by the display panel DP and estimated by the user may change according to the ambient color temperature graph 40.

Referring to an estimated color temperature graph 41, the estimated color temperature may stabilize by gradually decreasing during a second time interval t2 from a time point at which the temperature is changed from the first temperature K1 to the second temperature K2. That is, the second time interval t2 may be taken until the color appearance of the display panel DP gradually stabilizes again to a predetermined level. Here, the second time interval t2 may refer to an eye adaptation time taken for color adaptation.

According to an embodiment, when the ambient color temperature decreases, the estimated color temperature of the display panel DP may stabilize by decreasing from a first estimated color temperature W1 to a second estimated color temperature W2 from a time point at which the ambient color temperature is changed. Here, the second estimated color temperature W2 may be lower than the first estimated color temperature W1.

In addition, the time interval in which the first estimated color temperature W1 is changed to the second estimated color temperature W2 may be the second time interval t2. The second time interval t2 may be longer than the first time interval t1 in which the estimated color temperature stabilizes by being changed when the ambient color temperature increases.

FIG. 12 is a graph illustrating an embodiment of the method of controlling the display panel to maintain the estimated color when the color temperature of ambient light decreases.

Referring to FIG. 12, the controller 300 may control the display panel DP in response to the estimated color temperature of the display panel DP when the color temperature of ambient light decreases. Here, it will be assumed that white input image data IDATA is received for the convenience of description.

Referring to FIGS. 11 and 12, when the ambient color temperature measured by the illumination sensor 100 decreases, the controller 300 may control the display panel so that the color temperature (or color coordinates) of light emitted by the pixels increases during the second time interval t2. During the second time interval t2, the controller 300 may control the display panel DP to change the color temperature of the pixels from a first color temperature C1 to a second color temperature C2. Here, the second color temperature C2 may be higher than the first color temperature C1.

As described above, the first and second color temperatures C1 and C2 may be set by considering the first and second estimated color temperatures W1 and W2 during the second time interval t2 in FIG. 11. Even in the case that the same input image data IDATA is continuously received, the controller 300 may control the display panel driver 200 so that light generated by the display panel DP sequentially has the first and second color temperatures C1 and C2 during the second time interval t2 in response to the illumination data EvS including the ambient color temperature data.

The controller 300 may set the color temperatures C1 and C2 of the pixels inversely proportional to the first and second estimated color temperatures W1 and W2. The color temperatures C1 and C2 of the pixels may gradually increase according to gradual decrease of the first and second estimated color temperatures W1 and W2.

The controller 300 may control the color temperature of the pixels to increase from the first color temperature C1 to the second color temperature C2 from a time point at which the ambient color temperature is changed. Here, the difference between the first color temperature C1 and the second color temperature C2 may correspond to the difference between the first estimated color temperature W1 and the second estimated color temperature W2.

In embodiments, the controller 300 may control the color temperature of the pixels by adjusting a drive control signal according to an RGB signal corresponding to variations of the first color temperature C1 and the second color temperature C2. However, the method of adjusting the color temperature is not limited thereto but may be variously changed.

The controller 300 may control the color temperature of the pixels so that the slope corresponding to the color temperature variation per hour gradually decreases during the second time interval t2. The controller 300 may perform the controlling so that the color temperature variation per hour gradually decreases as getting closer to the second color temperature C2.

As described above, even in the case that the color temperature of ambient light decreases, the controller 300 may control the color temperature of the pixels according to the time interval in which the estimated color temperature is changed, thereby maintaining the estimated color temperature of the display panel DP at the first estimated color temperature W1. That is, the controller 300 may control the estimated color temperature of the display panel DP to appear as an estimated color temperature graph 43.

As set forth above, when the color temperature of ambient light decreases, the controller 300 may control each of the pixels to generate light having an adjusted color temperature (or color coordinates) according the estimated color temperature in a predetermined time interval. The display device DD may maintain the estimated color temperature of the display panel DP to be the same as before the color temperature of ambient light increases, thereby improving the image quality of the display panel DP and minimizing visual fatigue of the user.

According to embodiments of the present disclosure, the display device and the method of driving the display device may perform sensing with improved reliability.

Effects according to embodiments are not limited by contents exemplified above, and more various effects are included in the present specification.

Although the certain embodiments and implementations have been described hereinabove, other embodiments and modifications will be apparent from the above description. Accordingly, the inventive concepts are not limited to such embodiments, but rather to the broader scope of the presented claims and various obvious modifications and equivalent arrangements.

What is claimed is:

1. A display device comprising:
a display panel comprising pixels configured to display an image;
an illumination sensor configured to measure an illumination of ambient light of the display panel; and
a controller configured to control the display panel so that luminance of the pixels decreases during a first time interval when the illumination of the ambient light decreases, and control the display panel so that the luminance of the pixels increases during a second time interval when the illumination of the ambient light increases,
wherein the first time interval is shorter than the second time interval, and
wherein, when luminance of the image is the same as or higher than a critical value, the second time interval is at least two times the first time interval.

2. The display device of claim 1, wherein:
when the luminance of the image is lower than the critical value, the controller controls the display panel so that the luminance of the pixels decreases during the first time interval, when the illumination of the ambient light decreases, and controls the display panel so that the luminance of the pixels increases during the second time interval when the illumination of the ambient light increases, and
when the luminance of the image is higher than or the same as the critical value, the controller controls the display panel so that the luminance of the pixels decreases during a third time interval which is different from the length of the first time interval, when the illumination of the ambient light decreases, and controls the display panel so that the luminance of the pixels increases during a fourth time interval which is different from the length of the second time interval, when the illumination of the ambient light increases.

3. The display device of claim 2, wherein the third time interval is longer than the first time interval, and the fourth time interval is longer than the second time interval.

4. The display device of claim 2, further comprising a memory storing information indicating the first time interval, the second time interval, the third time interval and the fourth time interval.

5. The display device of claim 1, wherein the controller controls the display panel so that the luminance of the pixels changes from a first luminance level to a second luminance level and the second luminance level to a third luminance level during the first time interval, and
wherein the second luminance level is lower than each of the first luminance level and the third luminance level.

6. The display device of claim 5, wherein the third luminance level is lower than the first luminance level.

7. The display device of claim 5, wherein a difference between the first luminance level and the second luminance level is greater than a difference between the second luminance level and the third luminance level.

8. The display device of claim 5, wherein the first time interval comprises a first sub-time interval in which the luminance of the pixels changes from the first luminance level to the second luminance level and a second sub-time interval in which the luminance of the pixels changes from the second luminance level to the third luminance level, and
wherein the first sub-time interval is shorter than the second sub-time interval.

9. The display device of claim 1, wherein the controller controls the display panel so that the luminance of the pixels gradually increases from a first luminance level to a second luminance level higher than the first luminance level during the second time interval.

10. The display device of claim 1, wherein the controller controls the display panel to maintain a level corresponding to the luminance of the image when the measured illumination is returned within a predetermined time.

11. The electronic device of claim 1, wherein the controller controls the display panel to maintain a level corresponding to the luminance of the image when the measured illumination is returned within a predetermined time.

12. A display device comprising:
a display panel comprising pixels configured to display an image;
an illumination sensor configured to measure a color temperature of ambient light of the display panel; and
a controller configured to control the display panel so that a color temperature of the pixels decreases during a first time interval when the color temperature of the ambient light increases and control the display panel so that the color temperature of the pixels increases during a second time interval when the color temperature of the ambient light decreases,
wherein the first time interval is shorter than the second time interval.

13. The display device of claim 12, wherein the controller controls the display panel so that the color temperature of the pixels changes from a first color temperature to a second color temperature and the second color temperature to a third color temperature during the first time interval, and
wherein the second color temperature is lower than each of the first color temperature and the third color temperature.

14. The display device of claim 13, wherein the third color temperature is lower than the first color temperature.

15. The display device of claim 13, wherein a difference between the first color temperature and the second color temperature is greater than a difference between the second color temperature and the third color temperature.

16. The display device of claim 13, wherein the first time interval comprises a first sub-time interval in which the color temperature of the pixels changes from the first color temperature to the second color temperature and a second sub-time interval in which the color temperature of the pixels changes from the second color temperature to the third color temperature, and
wherein the first sub-time interval is shorter than the second sub-time time interval.

17. The display device of claim 12, wherein the controller controls the display panel so that the color temperature of the pixels gradually increases from the first color temperature to the second color temperature higher than the first color temperature during the second time interval.

18. A electronic device including a display device, the display device comprising:
a display panel comprising pixels configured to display an image;
an illumination sensor configured to measure an illumination of ambient light of the display panel; and a controller configured to control the display panel so that luminance of the pixels decreases during a first time interval when the illumination of the ambient light decreases, and control the display panel so that the luminance of the pixels increases during a second time interval when the illumination of the ambient light increases, wherein the first time interval is shorter than the second time interval, and wherein, when luminance of the image is the same as or higher than a critical value, the second time interval is at least two times the first time interval.

19. The electronic device of claim 18, wherein the controller controls the display panel so that the luminance of the pixels changes from a first luminance level to a second luminance level and the second luminance level to a third luminance level during the first time interval, and wherein the second luminance level is lower than each of the first luminance level and the third luminance level.

* * * * *